(12) United States Patent
Yang

(10) Patent No.: US 9,659,715 B2
(45) Date of Patent: May 23, 2017

(54) ELECTRICITY STORING/DISCHARGING DEVICE HAVING MULTIPLE INPUT/OUTPUT ELECTRIC CONDUCTIVE INTERFACE COVERED BY ELECTRODE PLATE PAIR WITH MULTIPLE-SIDED ELECTRIC CONDUCTIVE TERMINALS WITH A SINGLE LAYER MEANS

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 184 days.

(21) Appl. No.: 14/310,498

(22) Filed: Jun. 20, 2014

(65) Prior Publication Data

US 2015/0371789 A1 Dec. 24, 2015

(51) Int. Cl.

| | |
|---|---|
| *H01M 4/70* | (2006.01) |
| *H01M 2/26* | (2006.01) |
| *H01M 2/30* | (2006.01) |
| *H01G 11/24* | (2013.01) |
| *H01G 11/52* | (2013.01) |
| *H01G 11/74* | (2013.01) |
| *H01M 10/04* | (2006.01) |
| *H01M 2/02* | (2006.01) |
| *H01M 8/0247* | (2016.01) |
| *H01M 2/10* | (2006.01) |
| *H01M 2/16* | (2006.01) |

(52) U.S. Cl.
CPC .............. *H01G 11/24* (2013.01); *H01G 11/52* (2013.01); *H01G 11/74* (2013.01); *H01M 2/021* (2013.01); *H01M 2/027* (2013.01); *H01M 2/0212* (2013.01); *H01M 2/0277* (2013.01); *H01M 2/0285* (2013.01); *H01M 2/0287* (2013.01); *H01M 2/0292* (2013.01); *H01M 2/26* (2013.01); *H01M 2/30* (2013.01); *H01M 4/70* (2013.01); *H01M 10/045* (2013.01); *H01M 2/1061* (2013.01); *H01M 2/1653* (2013.01); *H01M 8/0247* (2013.01); *H01M 10/0413* (2013.01); *H01M 10/0431* (2013.01); *H01M 10/0436* (2013.01); *H01M 10/0445* (2013.01)

(58) Field of Classification Search
None
See application file for complete search history.

(56) References Cited

U.S. PATENT DOCUMENTS

| | | | | |
|---|---|---|---|---|
| 2010/0136381 A1* | 6/2010 | Yang | ...................... | H01G 11/72 429/517 |
| 2010/0266888 A1* | 10/2010 | Menti | ..................... | H01M 2/16 429/129 |
| 2011/0129721 A1* | 6/2011 | Yang | ...................... | H01M 4/70 429/161 |
| 2012/0202105 A1* | 8/2012 | Shinyashiki | ............ | H01M 2/22 429/153 |

* cited by examiner

*Primary Examiner* — Daniel Gatewood
(74) *Attorney, Agent, or Firm* — Bacon & Thomas, PLLC

(57) ABSTRACT

The present invention provides an electricity storing/discharging device having multiple input/output electric conductive interface covered by electrode plate pair with multiple-sided electric conductive terminals with a single layer means, which is applied in a specific multiple-sided package structure having electrode plate pair with multiple-sided electric conductive terminals and a multiple-directional input/output electric conductive interfaces, so the electrode plate pair is able to be installed on at least one multiple-sided electric conductive terminal and/or at least one side for forming an electric conductive interface so as to transfer electric energy to the exterior.

26 Claims, 12 Drawing Sheets

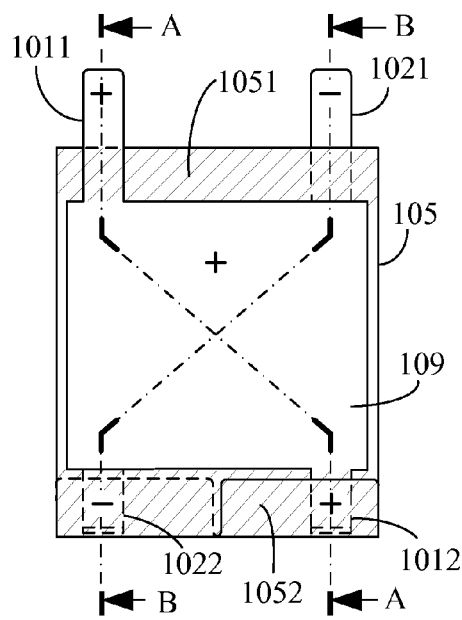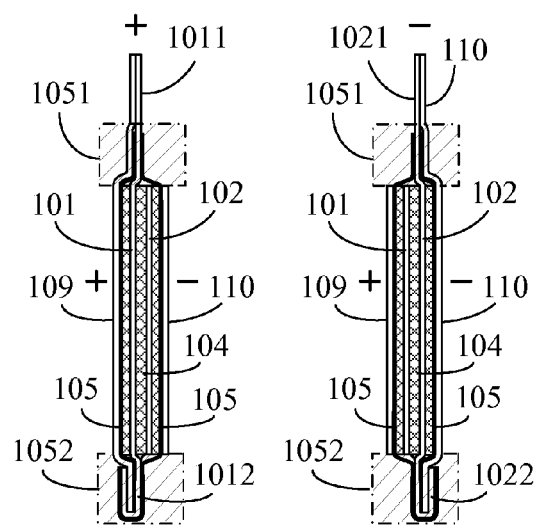
Fig. 9　　　　　Fig. 10　　　Fig. 11
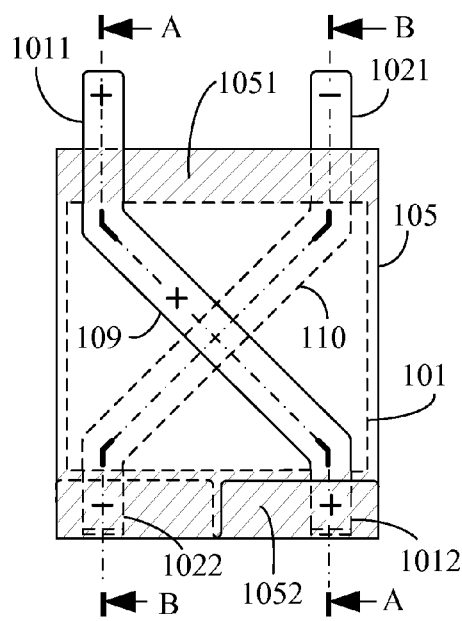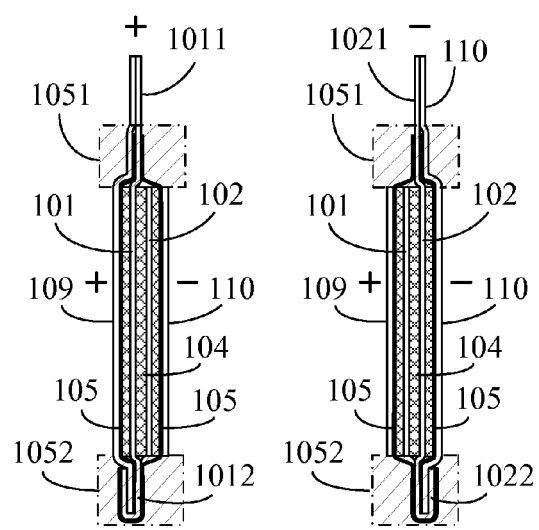
Fig. 12　　　　　Fig. 13　　　Fig. 14

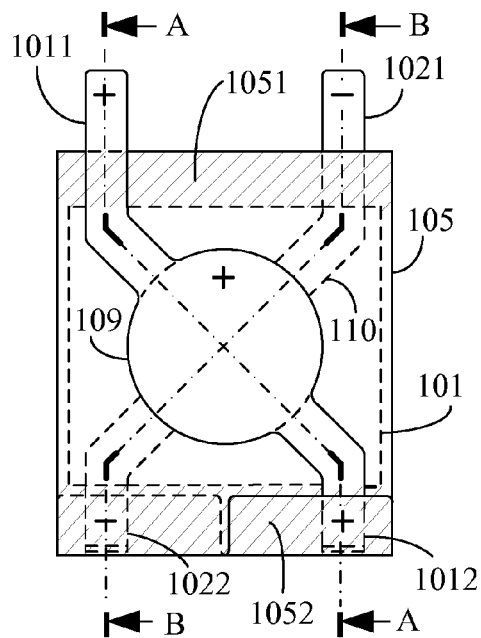
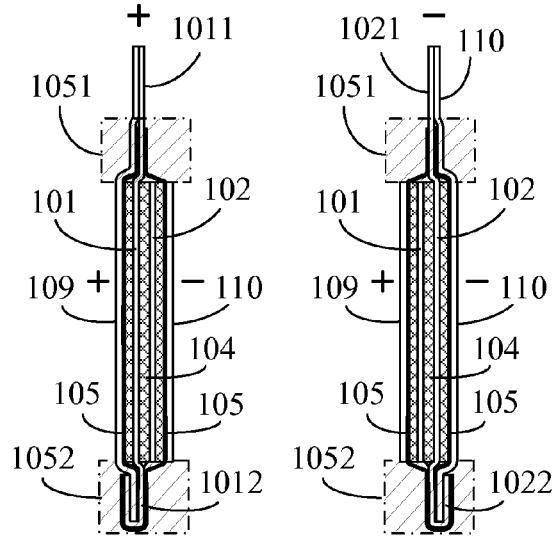
Fig. 15　　　　Fig. 16　　Fig. 17
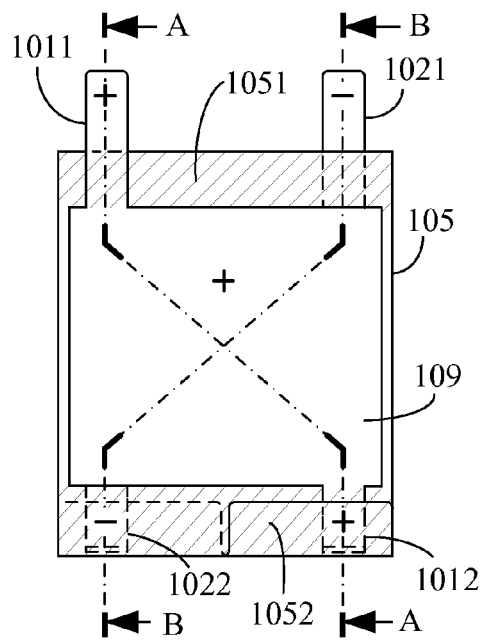
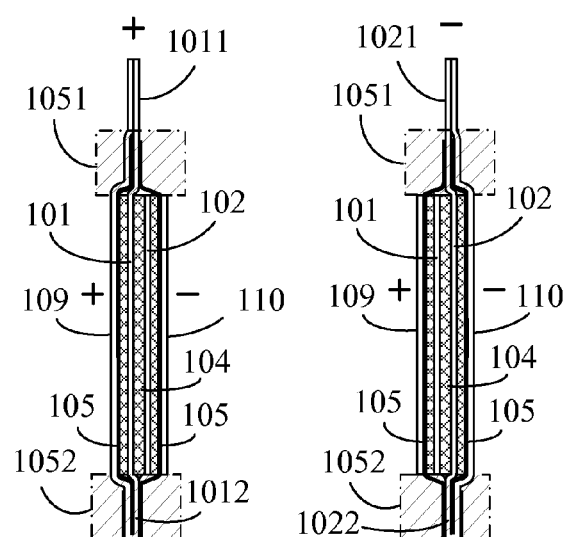
Fig. 18　　　　Fig. 19　　Fig. 20

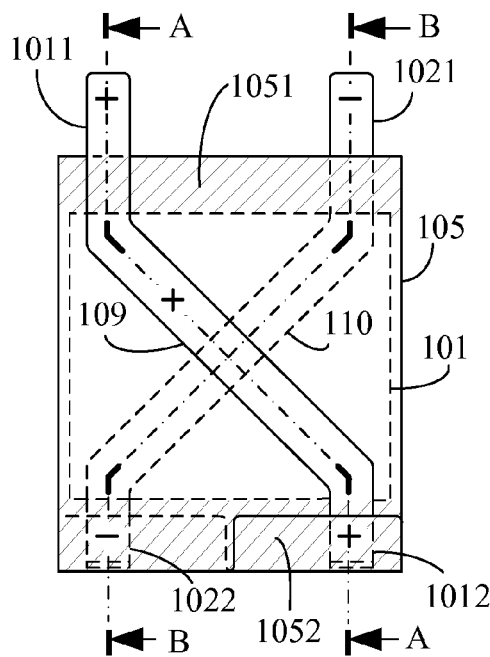
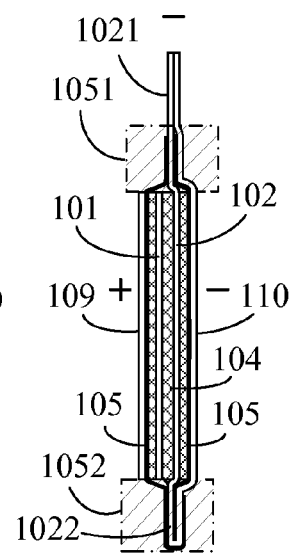
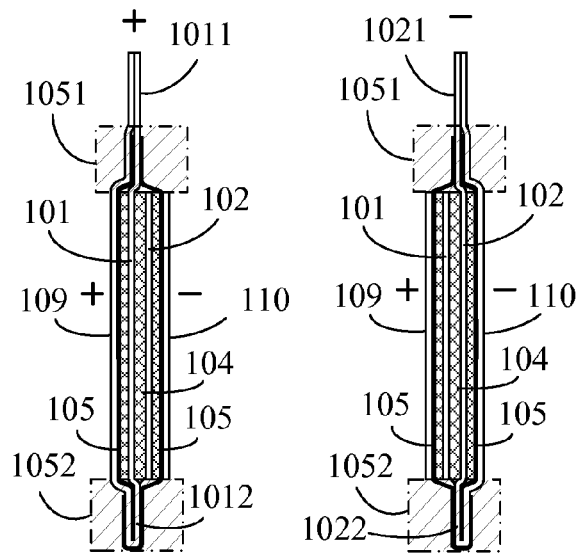
Fig. 21　　　　　Fig. 22　　　　　Fig. 23
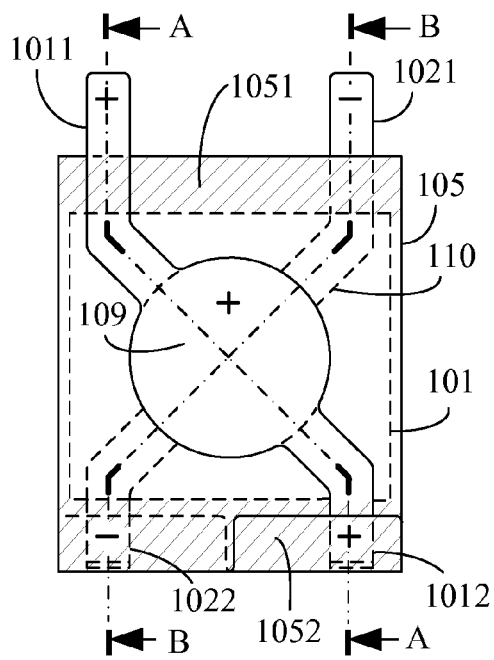
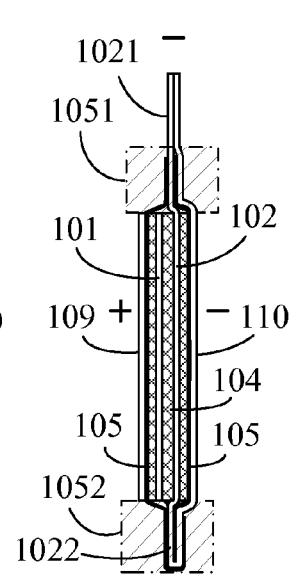
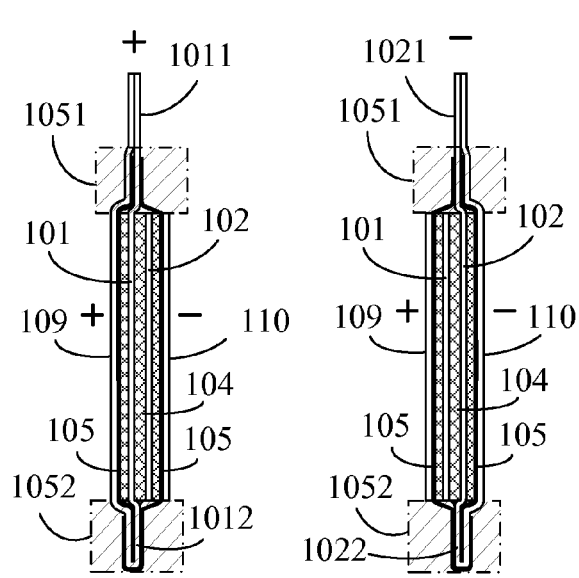
Fig. 24　　　　　Fig. 25　　　　　Fig. 26

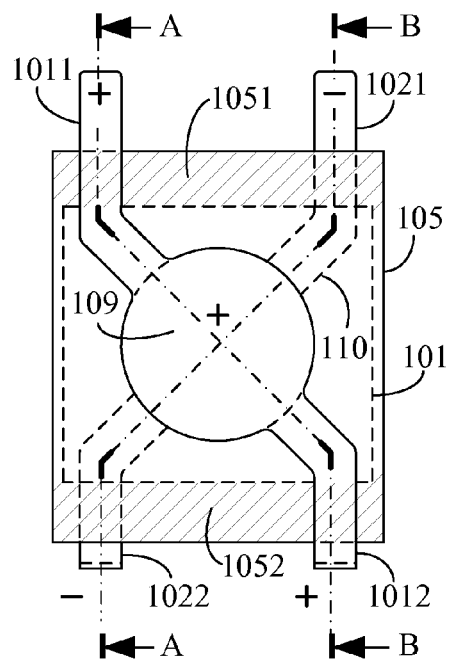
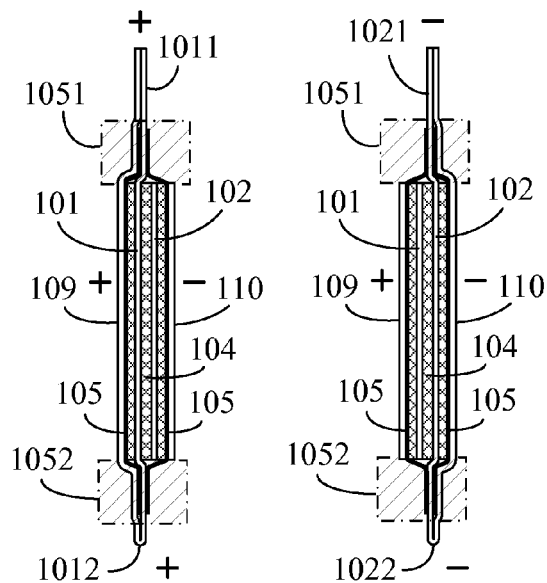
Fig. 33  Fig. 34  Fig. 35
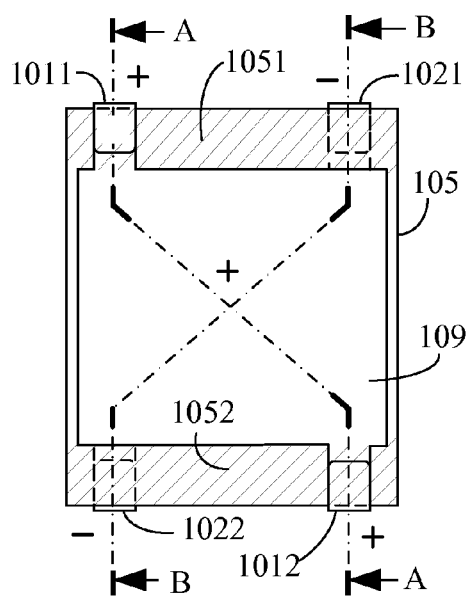
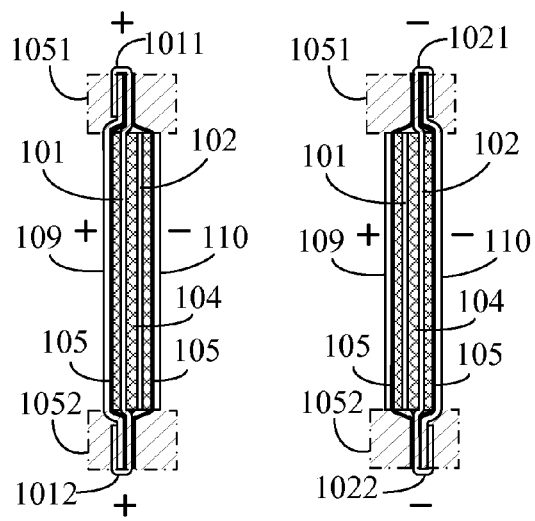
Fig. 36  Fig. 37  Fig. 38

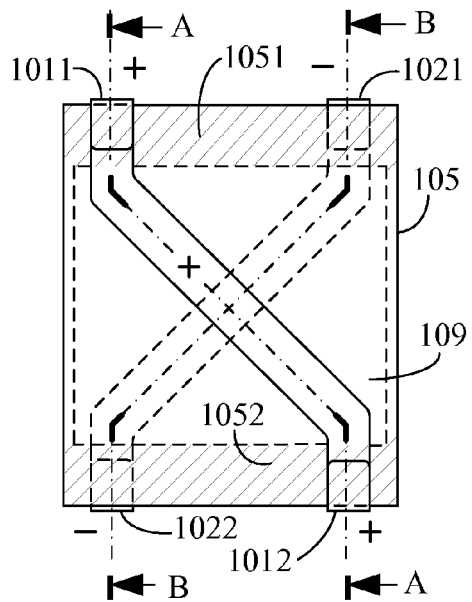 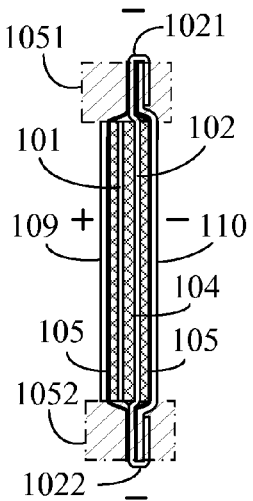 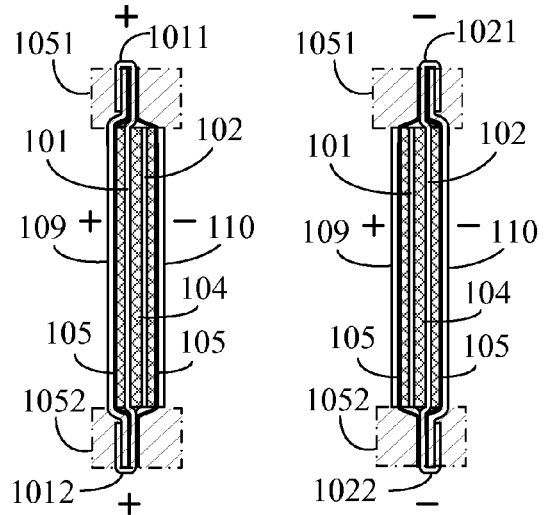
Fig. 39    Fig. 40    Fig. 41
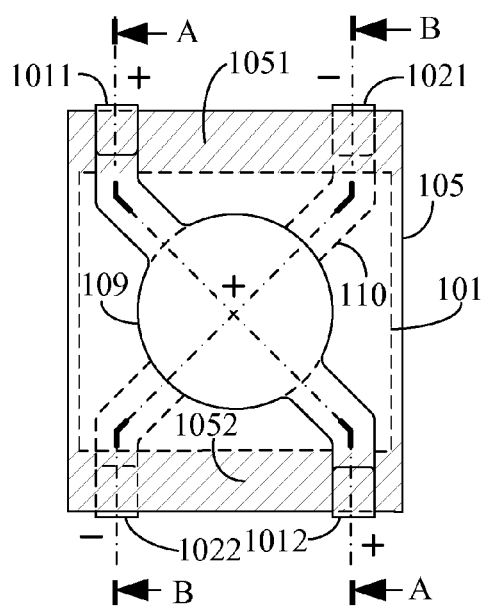 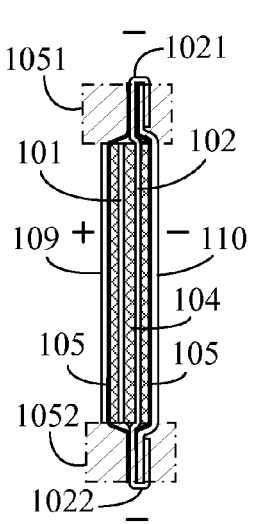 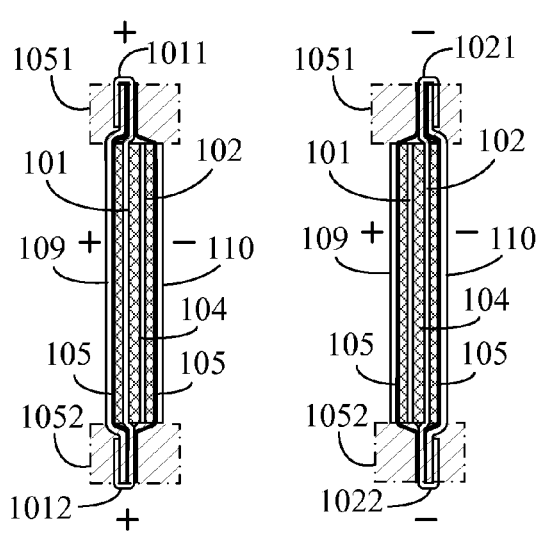
Fig. 42    Fig. 43    Fig. 44

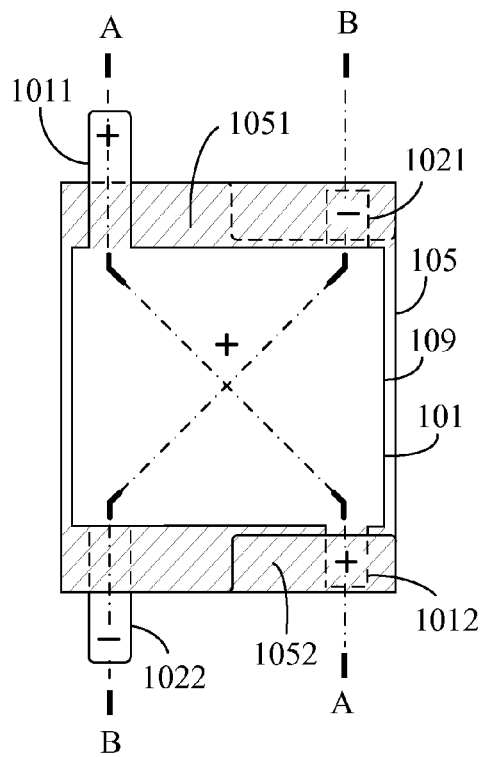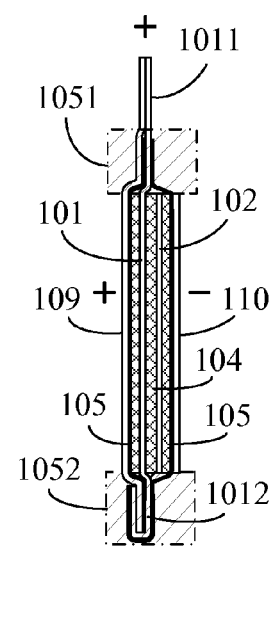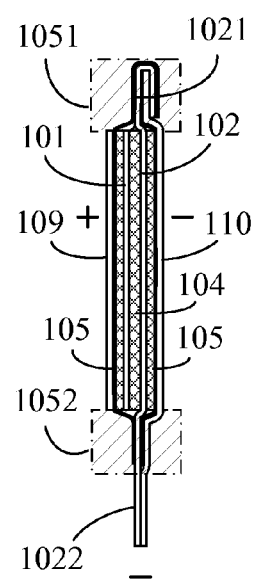
Fig. 45　　　　　　Fig. 46　　　　　Fig. 47
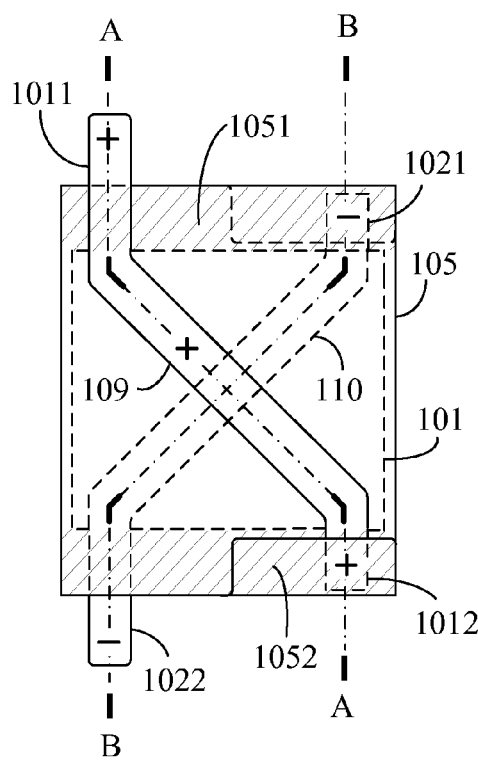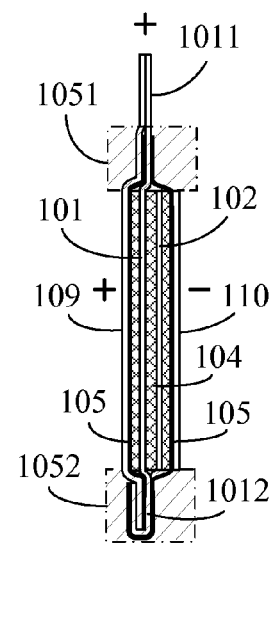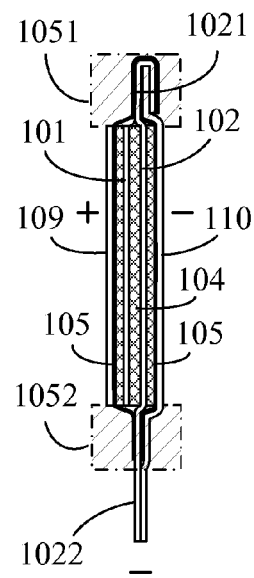
Fig. 48　　　　　　Fig. 49　　　　　Fig. 50

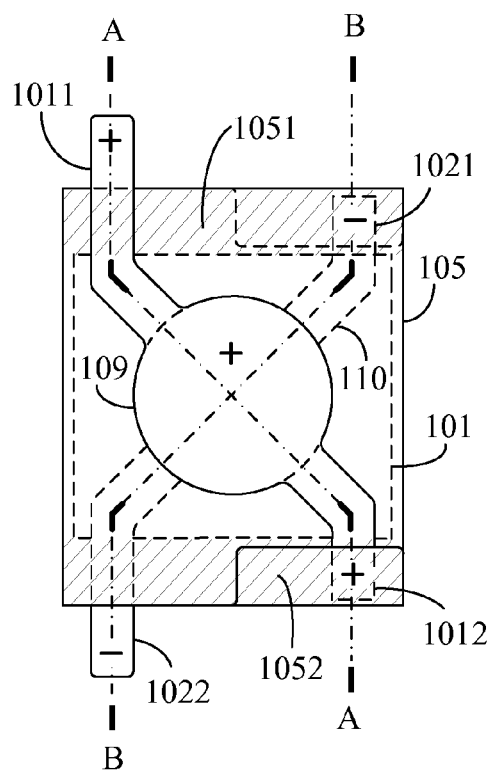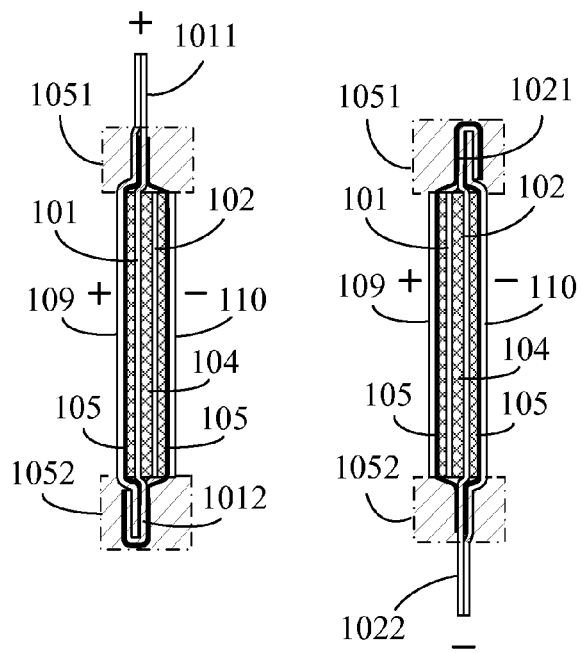
Fig. 51　　　Fig. 52　　　Fig. 53
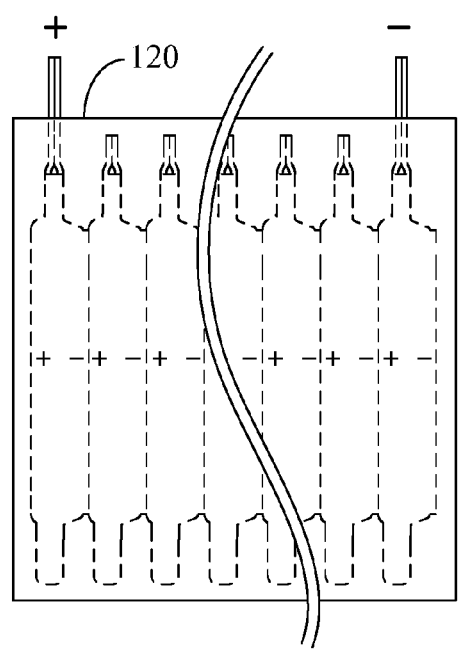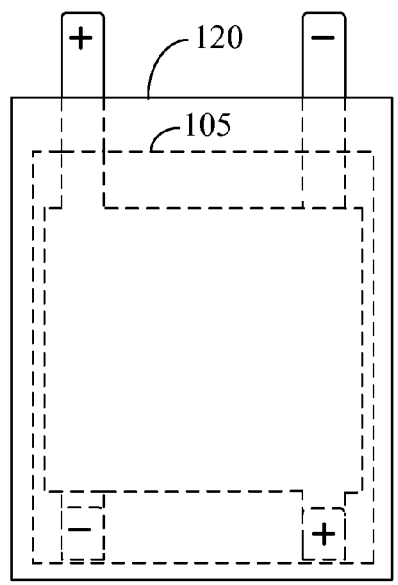
Fig. 54　　　Fig. 55

US 9,659,715 B2

ELECTRICITY STORING/DISCHARGING DEVICE HAVING MULTIPLE INPUT/OUTPUT ELECTRIC CONDUCTIVE INTERFACE COVERED BY ELECTRODE PLATE PAIR WITH MULTIPLE-SIDED ELECTRIC CONDUCTIVE TERMINALS WITH A SINGLE LAYER MEANS

BACKGROUND OF THE INVENTION (a) Field of the Invention

The present invention provides an electricity storing/discharging device having multiple input/output electric conductive interface covered by electrode plate pair with multiple-sided electric conductive terminals with a single layer means, which is applied in a specific multiple-sided package structure having electrode plate pair with multiple-sided electric conductive terminals and a multiple-directional input/output electric conductive interfaces, so the electrode plate pair is able to be installed on at least one multiple-sided electric conductive terminal and/or at least one side for forming an electric conductive interface so as to transfer electric energy to the exterior, or further to be connected in series, in parallel, in series then in parallel or in parallel then in series for forming as a module applicable for various requirements.

(b) Description of the Prior Art

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means.

SUMMARY OF THE INVENTION

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means;

The present invention provides an electricity storing/discharging device having multiple input/output electric conductive interface covered by electrode plate pair with multiple-sided electric conductive terminals with a single layer means, which is applied in a specific multiple-sided package structure having electrode plate pair with multiple-sided electric conductive terminals and a multiple-directional input/output electric conductive interfaces, so the electrode plate pair is able to be installed on at least one multiple-sided electric conductive terminal and/or at least one side for forming an electric conductive interface so as to transfer electric energy to the exterior, or further to be connected in series, in parallel, in series then in parallel or in parallel then in series for forming as a module applicable for various requirements.

BRIEF DESCRIPTION OF THE DRAWINGS

FIG. 9 is a schematic structural view showing the input/output electric conductive terminals having positive and negative polarities at one side of the electrode plate pair and a rectangular sheet-like lateral positive electric conductive member (109) and a lateral negative electric conductive member (110) at two lateral sides being structured as a multiple input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

FIG. 12 is a schematic structural view showing the input/output electric conductive terminals having positive and negative polarities at one side of the electrode plate pair and the rectangular sheet-like lateral positive electric conductive member (109) and the lateral negative electric conductive member (110) at two lateral sides are structured as the multiple input/output electric conductive interface according to one embodiment of the present invention.

FIG. 13 is a lateral cross sectional view of FIG. 12 taken along A-A.

FIG. 14 is a lateral cross sectional view of FIG. 12 taken along B-B.

FIG. 15 is a schematic structural view showing the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

FIG. 16 is a lateral cross sectional view of FIG. 15 taken along A-A.

FIG. 17 is a lateral cross sectional view of FIG. 15 taken along B-B.

FIG. 18 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the rectangular sheet-like lateral positive electric conductive member (109) and the lateral negative electric conductive member (110) at two lateral sides being structured as the multiple input/output electric conductive interface according to one embodiment of the present invention.

FIG. 19 is a lateral cross sectional view of FIG. 18 taken along A-A.

FIG. 20 is a lateral cross sectional view of FIG. 18 taken along B-B.

FIG. 21 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the strip-like lateral positive electric conductive member (109) and the lateral negative electric conductive member (110) at two lateral sides being structured as the multiple input/output electric conductive interface according to one embodiment of the present invention.

FIG. 22 is a lateral cross sectional view of FIG. 21 taken along A-A.

FIG. 23 is a lateral cross sectional view of FIG. 21 taken along B-B.

FIG. 24 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 25 is a lateral cross sectional view of FIG. 24 taken along A-A.

FIG. 26 is a lateral cross sectional view of FIG. 24 taken along B-B.

FIG. 33 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 34 is a lateral cross sectional view of FIG. 33 taken along A-A.

FIG. 35 is a lateral cross sectional view of FIG. 33 taken along B-B.

FIG. 36 is a schematic structural view showing the input/output electric conductive terminals having positive and negative polarities and respectively formed by a folded structure at two sides of the electrode plate pair and the rectangular sheet-like lateral positive electric conductive member (109) and the lateral negative electric conductive member (110) at two lateral sides being structured as the multiple input/output electric conductive interface according to one embodiment of the present invention.

FIG. 37 is a lateral cross sectional view of FIG. 36 taken along A-A.

FIG. 38 is a lateral cross sectional view of FIG. 36 taken along B-B.

FIG. 39 is a schematic structural view showing the input/output electric conductive terminals having positive and negative polarities respectively formed by a folded structure at two sides of the electrode plate pair and the strip-like lateral positive electric conductive member (109) and the lateral negative electric conductive member (110) at two lateral sides being structured as the multiple input/output electric conductive interface according to one embodiment of the present invention.

FIG. 40 is a lateral cross sectional view of FIG. 39 taken along A-A.

FIG. 41 is a lateral cross sectional view of FIG. 39 taken along B-B.

FIG. 42 is a schematic structural view showing the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 43 is a lateral cross sectional view of FIG. 42 taken along A-A.

FIG. 44 is a lateral cross sectional view of FIG. 42 taken along B-B.

FIG. 45 is a schematic structural view showing an input/output electric conductive terminal having different polarity and respectively provided at two ends defined at the same side of the electrode plate pair and the rectangular sheet-like lateral positive electric conductive member (109) and the lateral negative electric conductive member (110) at two lateral sides of the electrode plate pair being structured as the multiple input/output electric conductive interface according to one embodiment of the present invention.

FIG. 46 is a lateral cross sectional view of FIG. 45 taken along A-A.

FIG. 47 is a lateral cross sectional view of FIG. 45 taken along B-B.

FIG. 48 is a schematic structural view showing an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair being structured as the multiple input/output electric conductive interface according to one embodiment of the present invention.

FIG. 49 is a lateral cross sectional view of FIG. 48 taken along A-A.

FIG. 50 is a lateral cross sectional view of FIG. 48 taken along B-B.

FIG. 51 is a schematic structural view showing an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair being structured as the multiple input/output electric conductive interface according to one embodiment of the present invention.

FIG. 52 is a lateral cross sectional view of FIG. 51 taken along A-A.

FIG. 53 is a lateral cross sectional view of FIG. 51 taken along B-B.

FIG. 54 is a schematic structural view showing the electricity storing/discharging cells being disposed inside the housing (120) for forming as a module according to the present invention.

FIG. 55 is a lateral structural view of FIG. 54.

DESCRIPTION OF MAIN COMPONENT SYMBOLS

Figure 1:
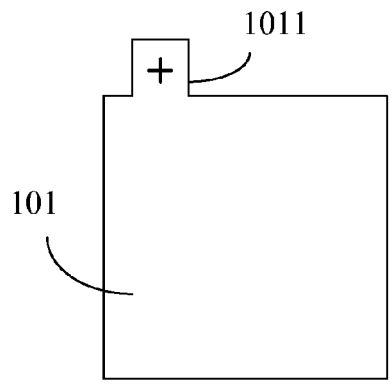
FIG. 1 is a schematic structural view showing a conventional electrode plate having single-sided electric energy transferring terminal.

101: Positive electrode plate
102: Negative electrode plate
104: Separator
105: Insulation package enclose member
1051、1052: Sealing zone
109: Lateral positive electric conductive member
110: Lateral negative electric conductive member
120: Housing
1011、1011'、1012、1012'、1013、1013'、1014、1014'、1021、1022、1023、1024: Electric conductive terminal for inputting/outputting electric energy

DETAILED DESCRIPTION OF THE PREFERRED EMBODIMENTS

A electrode plate is a fundamental component for structuring a primary cell or a rechargeable secondary cell or a capacitor or a super capacitor and a fuel cell for outputting electric energy, the configuration thereof is often composed of electrode plates having various geometric shapes, and at least a positive electrode plate and at least a negative electrode plate having the same or different quantity are formed as an electrode plate pair so as to structure an electricity storing/discharging cell, and at least two electricity storing/discharging cells are adopted for being homopolarity connected in parallel or normal-polarity connected in series or being connected in series then in parallel or connected in parallel then in series for forming as a module applicable for various requirements.

It is well known that the electrode plate applied in the above-mentioned primary cell or rechargeable secondary cell or capacitor or super capacitor and fuel cell for outputting electric energy is mainly formed in a circular or rectangular shape or other geometric shapes according to actual needs, and the electrode plate and the electric conductive terminal for inputting/outputting electric energy are often exposed outside a sealed housing, when the electrode plate pair with multiple-sided input/output electric conductive terminals are adopted, an additional electric conductive member has to be provided for connection, as such, inconvenience in connection is caused when a soft package material is adopted.

The present invention provides an electricity storing/discharging device having multiple input/output electric conductive interface covered by electrode plate pair with multiple-sided electric conductive terminals with a single layer means, which is applied in a specific multiple-sided package structure having electrode plate pair with multiple-sided electric conductive terminals and a multiple-directional input/output electric conductive interfaces, so the electrode plate pair is able to be installed on at least one multiple-sided electric conductive terminal and/or at least one side for forming an as electric conductive interface so as to transfer electric energy to the exterior, or further to be connected in series, in parallel, in series then in parallel or in parallel then in series for forming as a module applicable for various requirements.

According to the electricity storing/discharging device having multiple input/output electric conductive interface covered by electrode plate pair with multiple-sided electric conductive terminals with a single layer means, the electrode plate pair with multiple-sided input/output electric conductive terminals and the soft package material or rigid package material are able to be adopted at the same time for forming as a specific package structure.

Moreover, in a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means; a positive electrode plate is adopted for illustration (the same illustration can be applied to a negative electrode plate therefore not provided), as followings:

FIG. 1 is a schematic structural view showing a conventional electrode plate having single-sided electric energy transferring terminal.

As shown in FIG. 1, the electrode plate formed in a quadrilateral shape is provided as an example, and the main configuration is that one side of the quadrilateral electrode plate is outwardly extended for forming the electric conductive terminal for inputting/outputting electric energy.

Figure 2:
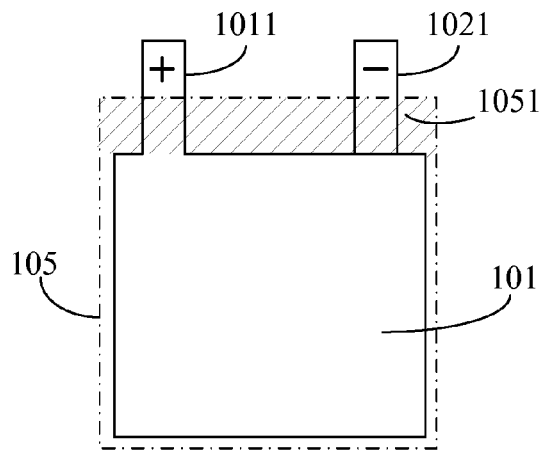
FIG. 2 is a schematic structural view showing a conventional electrode plate pair with single-sided electric energy transferring terminal being formed as an electricity storing/discharging cell.

FIG. 2 is a schematic structural view showing a conventional electrode plate pair with single-sided electric energy transferring terminal being formed as an electricity storing/discharging cell.

Figure 3:
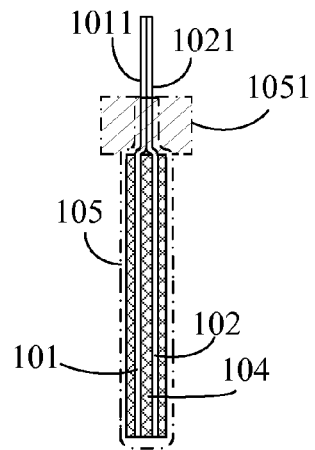
FIG. 3 is a lateral cross sectional view of FIG. 2.

FIG. 3 is a lateral cross sectional view of FIG. 2.

As shown in FIG. 2 and FIG. 3, the main configuration is that a quadrilateral positive electrode plate (101) having single-sided electric conductive terminal for inputting/outputting electric energy (1011) and a negative electrode plate (102) having single-sided electric conductive terminal for inputting/outputting electric energy (1021) are provided, and an separator is provided between the positive and the negative electrode plates, and the separator is directly installed or clamped at the exterior after an electrolyte solution or an electrolyte material is filled in then is disposed in an insulation package enclose member (105), and the electric conductive terminals for inputting/outputting electric energy (1011), (1012) are outwardly extended through a sealing zone (1051) from another side of the insulation package enclose member (105).

Figure 4:
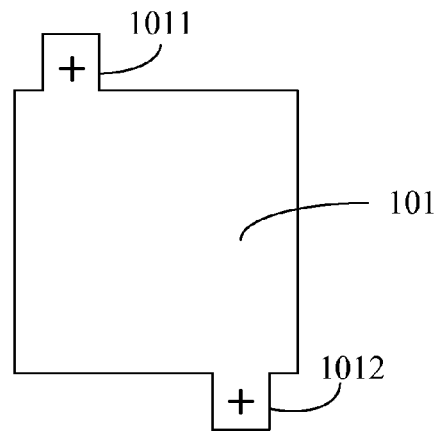
FIG. 4 is the first embodiment showing a conventional electrode plate having multiple-sided electric energy transferring terminals.

FIG. 4 is the first embodiment showing a conventional electrode plate having multiple-sided electric energy transferring terminals.

As shown in FIG. 4, the main configuration is that end portions defined at two opposite sides of the quadrilateral positive electrode plate (101) are respectively formed with an electric conductive terminal for inputting/outputting electric energy (1011), (1012).

Figure 5:
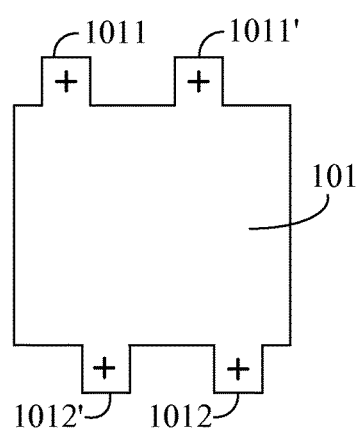
FIG. 5 is the second embodiment showing a conventional electrode plate having multiple-sided electric energy transferring terminals.

FIG. 5 is the second embodiment showing a conventional electrode plate having multiple-sided electric energy transferring terminals.

As shown in FIG. 5, the main configuration is that two opposite sides of the quadrilateral positive electrode plate (101) are respectively formed with two electric conductive terminals for inputting/outputting electric energy (1011), (1011') and two electric conductive terminals for inputting/outputting electric energy (1012), (1012'), wherein the electric conductive terminals for inputting/outputting electric energy (1011), (1011') formed at one side and the electric conductive terminals for inputting/outputting electric energy (1012), (1012') formed at the opposite side are staggeringly arranged.

Figure 6:
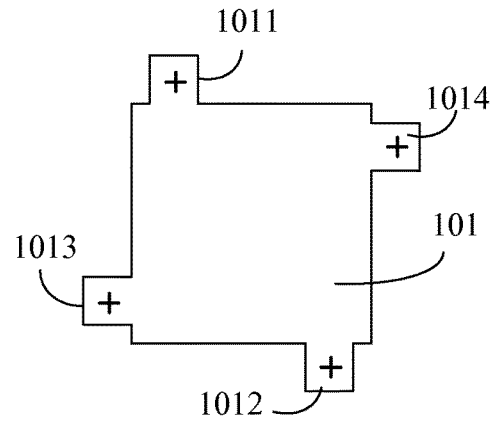
FIG. 6 is the third embodiment showing a conventional electrode plate having multiple-sided electric energy transferring terminals.

FIG. 6 is the third embodiment showing a conventional electrode plate having multiple-sided electric energy transferring terminals.

As shown in FIG. 6, four sides of the quadrilateral positive electrode plate (101) are respectively formed with an electric conductive terminal for inputting/outputting electric energy (1011), (1012), (1013), (1014), wherein the electric conductive terminals for inputting/outputting electric energy arranged at opposite sides are staggeringly arranged.

Figure 7:
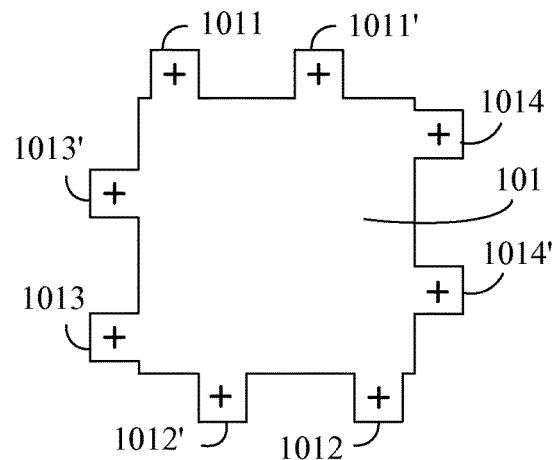
FIG. 7 is the fourth embodiment showing an electrode plate having multiple-sided electric energy transferring terminals.

FIG. 7 is the fourth embodiment showing an electrode plate having multiple-sided electric energy transferring terminals.

As shown in FIG. 7, a first side of the quadrilateral positive electrode plate (101) is formed with two electric conductive terminals for inputting/outputting electric energy (1011), (1011'), a second side thereof is formed with two electric conductive terminals for inputting/outputting electric energy (1012), (1012'), a third side thereof is formed with two electric conductive terminals for inputting/outputting electric energy (1013), (1013') and a fourth side thereof is formed with two electric conductive terminals for inputting/outputting electric energy (1014), (1014'), wherein the electric conductive terminals for inputting/outputting electric energy arranged at opposite sides are staggeringly arranged.

Figure 8:
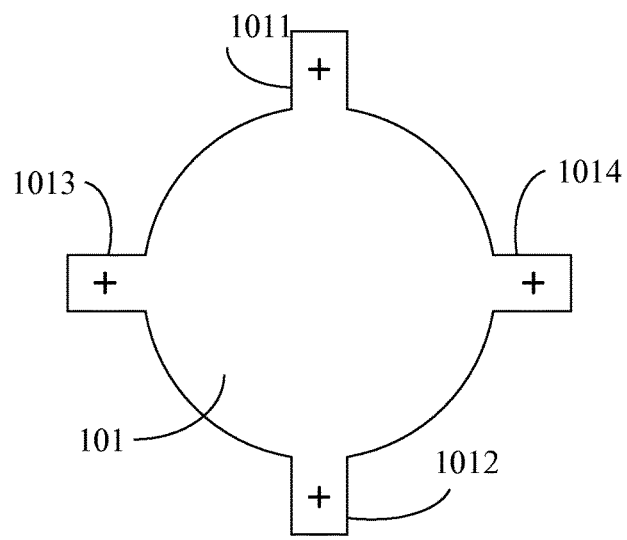
FIG. 8 is an embodiment showing a conventional circular electrode plate having electric energy transferring terminals.

FIG. 8 is an embodiment showing a conventional circular electrode plate having electric energy transferring terminals.

As shown in FIG. 8, the main configuration is that the periphery of the circular electrode plate is radially formed with electric conductive terminals for inputting/outputting electric energy (1011), (1012), (1013), (1014).

Other various geometric shapes have substantially the same feature, therefore no further illustration is provided.

The present invention discloses an electricity storing/discharging device having multiple input/output electric conductive interface covered by electrode plate pair with multiple-sided electric conductive terminals with a single layer means, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior, or further to be connected in series, in parallel or in series and parallel for forming as a module applicable for various requirements; because the shapes and types of electrode plates can be varied according to actual needs, a rectangular electrode plate is adopted herein for illustration, as followings:

FIG. 9 is a schematic structural view showing the input/output electric conductive terminals having positive and negative polarities at one side of the electrode plate pair and a rectangular sheet-like lateral positive electric conductive member (109) and a lateral negative electric conductive member (110) at two lateral sides being structured as a multiple input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

As shown in FIG. 9, FIG. 10 and FIG. 11, mainly consists:
  positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel.

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side, an electrolyte solution or an electrolyte material is filled in the insulation package enclosed member (105), the other opening allows the electric conductive terminal for inputting/outputting electric energy (1012) and the electric conductive terminal for inputting/outputting electric energy (1022) to be exposed, and the insulation package enclose member (105) is processed for forming a sealing zone (1052) so as to seal the portions of the electric conductive terminal for inputting/outputting electric energy (1012) and the electric conductive terminal for inputting/outputting electric energy (1022) defined close to the electrode plate, and the distal ends of the electric conductive terminal for inputting/outputting electric energy (1012) and the electric conductive terminal for inputting/outputting electric energy (1022) are exposed and inwardly bent along the exterior of the sealing zone (1052) of the insulation package enclosed member (105) thereby being respectively connected with the lateral positive electric conductive member (109) and the lateral negative electric conductive member (110), wherein the electric conductive terminal for inputting/outputting electric energy (1012) is conductive electrically connected to one end of the lateral positive electric conductive member (109), and the other end of the lateral positive electric conductive member (109) is conductive electrically connected to the electric conductive terminal for inputting/outputting electric energy (1011) thereby forming a parallel connection with positive polarity; the electric conductive terminal for inputting/outputting electric energy (1022) is electrically connected to one end of the lateral negative electric conductive member (110), and the other end of the lateral negative electric conductive member (110) is conductive electrically connected to the electric conductive terminal for inputting/outputting electric energy (1021) thereby forming a parallel conductive electrical connection with negative polarity, so an electricity storing/discharging cell is structured;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a rectangular sheet-like, or strip-like or circular sheet-like status, and the top and the bottom ends thereof are respectively extended with an electric conductive strip, the electric conductive strip respectively extended from the top and the bottom ends of the lateral positive electric conductive member (109) are then respectively and conductive electrically connected to the electric conductive terminal for inputting/outputting electric energy (1011) and the electric conductive terminal for inputting/outputting electric energy (1012) having positive polarity, and the electric conductive strip respectively extended from the top and the bottom ends of the lateral negative electric conductive member (110) are then respectively and conductive electrically connected to the electric conductive terminal for inputting/outputting electric energy (1021) and the electric conductive terminal for inputting/outputting electric energy (1022) having negative polarity.

FIG. 12 is a schematic structural view showing the input/output electric conductive terminals having positive and negative polarities at one side of the electrode plate pair and the rectangular sheet-like lateral positive electric conductive member (109) and the lateral negative electric conductive member (110) at two lateral sides are structured as the multiple input/output electric conductive interface according to one embodiment of the present invention.

FIG. 13 is a lateral cross sectional view of FIG. 12 taken along A-A.

FIG. 14 is a lateral cross sectional view of FIG. 12 taken along B-B.

As shown in FIG. 12, FIG. 13 and FIG. 14, the input/output electric conductive terminals having positive and negative polarities at one side of the electrode plate pair and the rectangular sheet-like lateral positive electric conductive member (109) and the lateral negative electric conductive member (110) at two lateral sides are structured as the multiple input/output electric conductive interface.

FIG. 15 is a schematic structural view showing the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

FIG. 16 is a lateral cross sectional view of FIG. 15 taken along A-A.

FIG. 17 is a lateral cross sectional view of FIG. 15 taken along B-B.

As shown in FIG. 15, FIG. 16 and FIG. 17, the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

FIG. 18 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the rectangular sheet-like lateral positive electric conductive member (109) and the lateral negative electric conductive member (110) at two lateral sides being structured as the multiple input/output electric conductive interface according to one embodiment of the present invention.

FIG. 19 is a lateral cross sectional view of FIG. 18 taken along A-A.

FIG. 20 is a lateral cross sectional view of FIG. 18 taken along B-B.

As shown in FIG. 18, FIG. 19 and FIG. 20, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the rectangular sheet-like lateral positive electric conductive member (109) and the lateral negative electric conductive member (110) at two lateral sides are structured as the multiple input/output electric conductive interface.

FIG. 21 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the strip-like lateral positive electric conductive member (109) and the lateral negative electric conductive member (110) at two lateral sides being structured as the multiple input/output electric conductive interface according to one embodiment of the present invention.

FIG. 22 is a lateral cross sectional view of FIG. 21 taken along A-A.

FIG. 23 is a lateral cross sectional view of FIG. 21 taken along B-B.

As shown in FIG. 21, FIG. 22 and FIG. 23, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the strip-like lateral positive electric conductive member (109) and the lateral negative electric conductive member (110) at two lateral sides are structured as the multiple input/output electric conductive interface.

FIG. 24 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 25 is a lateral cross sectional view of FIG. 24 taken along A-A.

FIG. 26 is a lateral cross sectional view of FIG. 24 taken along B-B.

As shown in FIG. 24, FIG. 25 and FIG. 26, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface.

Figure 27:
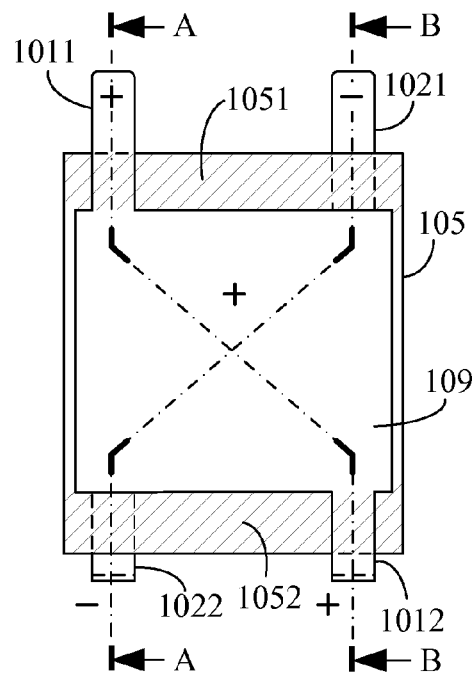
FIG. 27 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the rectangular sheet-like lateral positive electric conductive member (109) and the lateral negative electric conductive member (110) at two lateral sides being structured as the multiple input/output electric conductive interface according to one embodiment of the present invention.

FIG. 27 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the rectangular sheet-like lateral positive electric conductive member (109) and the lateral negative electric conductive member (110) at two lateral sides being structured as the multiple input/output electric conductive interface according to one embodiment of the present invention.

Figures 28, 29:
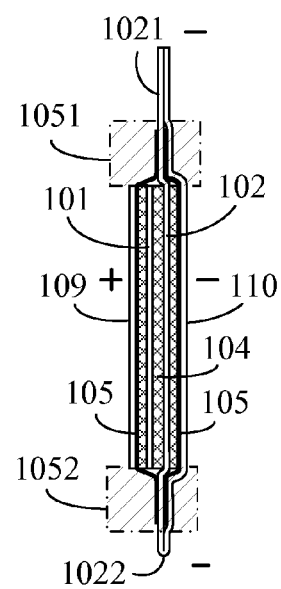
FIG. 28 is a lateral cross sectional view of FIG. 27 taken along A-A.
FIG. 29 is a lateral cross sectional view of FIG. 27 taken along B-B.

FIG. 28 is a lateral cross sectional view of FIG. 27 taken along A-A.

FIG. 29 is a lateral cross sectional view of FIG. 27 taken along B-B.

As shown in FIG. 27, FIG. 28 and FIG. 29, the positive electrode plate (101) and the lateral positive electric conductive member (109), and the negative electrode plate (102) and the lateral negative electric conductive member (110) are integrally formed, and the input/output electric conductive terminals having positive and negative polarities at two sides of the electrode plate pair and the rectangular sheet-like lateral positive electric conductive member (109) and the lateral negative electric conductive member (110) at two lateral sides are structured as the multiple input/output electric conductive interface.

Figure 30:
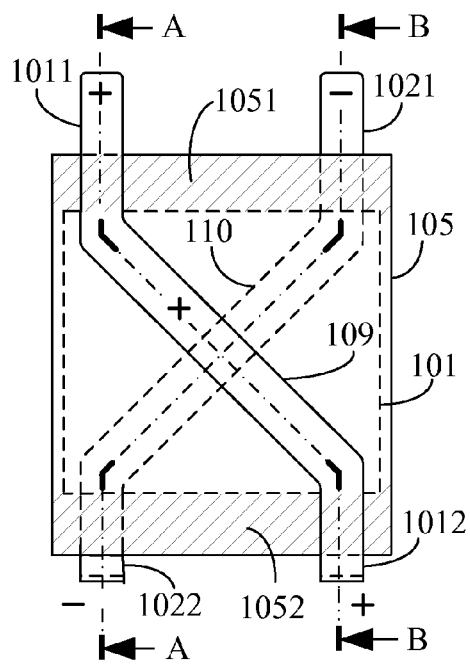
FIG. 30 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the strip-like lateral positive electric conductive member (109) and the lateral negative electric conductive member (110) at two lateral sides being structured as the multiple input/output electric conductive interface according to one embodiment of the present invention.

FIG. 30 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the strip-like lateral positive electric conductive member (109) and the lateral negative electric conductive member (110) at two lateral sides being structured as the multiple input/output electric conductive interface according to one embodiment of the present invention.

Figures 31, 32:
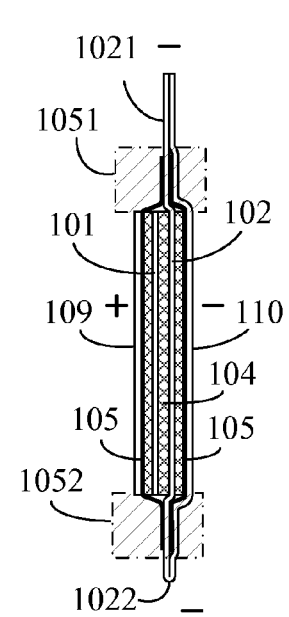
FIG. 31 is a lateral cross sectional view of FIG. 30 taken along A-A.
FIG. 32 is a lateral cross sectional view of FIG. 30 taken along B-B.

FIG. 31 is a lateral cross sectional view of FIG. 30 taken along A-A.

FIG. 32 is a lateral cross sectional view of FIG. 30 taken along B-B.

As shown in FIG. 30, FIG. 31 and FIG. 32, the positive electrode plate (101) and the lateral positive electric conductive member (109), and the negative electrode plate (102) and the lateral negative electric conductive member (110) are integrally formed, and the input/output electric conductive terminals having positive and negative polarities at two sides of the electrode plate pair and the strip-like lateral positive electric conductive member (109) and the lateral negative electric conductive member (110) at two lateral sides are structured as the multiple input/output electric conductive interface.

FIG. 33 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 34 is a lateral cross sectional view of FIG. 33 taken along A-A.

FIG. 35 is a lateral cross sectional view of FIG. 33 taken along B-B.

As shown in FIG. 33, FIG. 34 and FIG. 35, the positive electrode plate (101) and the lateral positive electric conductive member (109), and the negative electrode plate (102) and the lateral negative electric conductive member (110) are integrally formed, and the input/output electric conductive terminals having positive and negative polarities at two sides of the electrode plate pair and the circular sheet-like lateral positive electric conductive member (109) and the lateral negative electric conductive member (110) at two lateral sides are structured as the multiple input/output electric conductive interface.

FIG. 36 is a schematic structural view showing the input/output electric conductive terminals having positive and negative polarities and respectively formed by a folded structure at two sides of the electrode plate pair and the rectangular sheet-like lateral positive electric conductive member (109) and the lateral negative electric conductive member (110) at two lateral sides being structured as the multiple input/output electric conductive interface according to one embodiment of the present invention.

FIG. 37 is a lateral cross sectional view of FIG. 36 taken along A-A.

FIG. 38 is a lateral cross sectional view of FIG. 36 taken along B-B.

As shown in FIG. 36, FIG. 37 and FIG. 38, the input/output electric conductive terminals having positive and negative polarities and respectively formed by a folded structure at two sides of the electrode plate pair and the rectangular sheet-like lateral positive electric conductive member (109) and the lateral negative electric conductive member (110) at two lateral sides are structured as the multiple input/output electric conductive interface.

FIG. 39 is a schematic structural view showing the input/output electric conductive terminals having positive and negative polarities respectively formed by a folded structure at two sides of the electrode plate pair and the strip-like lateral positive electric conductive member (109) and the lateral negative electric conductive member (110) at two lateral sides being structured as the multiple input/output electric conductive interface according to one embodiment of the present invention.

FIG. 40 is a lateral cross sectional view of FIG. 39 taken along A-A.

FIG. 41 is a lateral cross sectional view of FIG. 39 taken along B-B.

As shown in FIG. 39, FIG. 40 and FIG. 41, the input/output electric conductive terminals having positive and negative polarities respectively formed by a folded structure at two sides of the electrode plate pair and the strip-like lateral positive electric conductive member (109) and the lateral negative electric conductive member (110) at two lateral sides are structured as the multiple input/output electric conductive interface.

FIG. 42 is a schematic structural view showing the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 43 is a lateral cross sectional view of FIG. 42 taken along A-A.

FIG. 44 is a lateral cross sectional view of FIG. 42 taken along B-B.

As shown in FIG. 42, FIG. 43 and FIG. 44, the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides are structured as the multiple input/output electric conductive interface.

FIG. 45 is a schematic structural view showing an input/output electric conductive terminal having different polarity and respectively provided at two ends defined at the same side of the electrode plate pair and the rectangular sheet-like lateral positive electric conductive member (109) and the lateral negative electric conductive member (110) at two lateral sides of the electrode plate pair being structured as the multiple input/output electric conductive interface according to one embodiment of the present invention.

FIG. 46 is a lateral cross sectional view of FIG. 45 taken along A-A.

FIG. 47 is a lateral cross sectional view of FIG. 45 taken along B-B.

As shown in FIG. 45, FIG. 46 and FIG. 47, an input/output electric conductive terminal having different polarity and respectively provided at two ends defined at the same side of the electrode plate pair and the rectangular sheet-like lateral positive electric conductive member (109) and the lateral negative electric conductive member (110) at two lateral sides of the electrode plate pair are structured as the multiple input/output electric conductive interface.

FIG. 48 is a schematic structural view showing an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair being structured as the multiple input/output electric conductive interface according to one embodiment of the present invention.

FIG. 49 is a lateral cross sectional view of FIG. 48 taken along A-A.

FIG. 50 is a lateral cross sectional view of FIG. 48 taken along B-B.

As shown in FIG. 48, FIG. 49 and FIG. 50, an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair are structured as the multiple input/output electric conductive interface.

FIG. 51 is a schematic structural view showing an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair being structured as the multiple input/output electric conductive interface according to one embodiment of the present invention.

FIG. 52 is a lateral cross sectional view of FIG. 51 taken along A-A.

FIG. 53 is a lateral cross sectional view of FIG. 51 taken along B-B.

As shown in FIG. 51, FIG. 52 and FIG. 53, an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair are structured as the multiple input/output electric conductive interface.

According to the above-mentioned embodiments, the lateral positive electric conductive member (109) and the lateral negative electric conductive member (110) at two sides of the electricity storing/discharging device having multiple input/output electric conductive interface covered by electrode plate pair with multiple-sided electric conductive terminals with a single layer means can be served as an input/output electric conductive interface for being individually used, or connected in series, in parallel or in series and parallel, the configuration includes:

exposed electric conductive surfaces of one lateral positive electric conductive member (109) and one opposite lateral negative electric conductive member (110) are directly formed as the input/output electric conductive interface for being individually used, or connected in series, in parallel or in series and parallel; or one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interface for being individually used, or connected in series, in parallel or in series and parallel.

After the plural electricity storing/discharging cells are structured, the electricity storing/discharging cells can be individually operated and combined through electric conductive members, at least one or more of the electricity storing/discharging cells are disposed in the interior of one or more of the housings so as to be collected for forming as a modularized structure which is connected through the electric conductive members or the input/output electric conductive interface of each electricity storing/discharging device for transferring electric energy.

FIG. 54 is a schematic structural view showing the electricity storing/discharging cells being disposed inside the housing (120) for forming as a module according to the present invention.

FIG. 55 is a lateral structural view of FIG. 54.

As shown in FIG. 54 and FIG. 55, at least one or more of the electricity storing/discharging cells are disposed inside the housing (120), wherein:

housing (120): made of a soft flexible material or a rigid material such as stainless steel.

Figure 56:
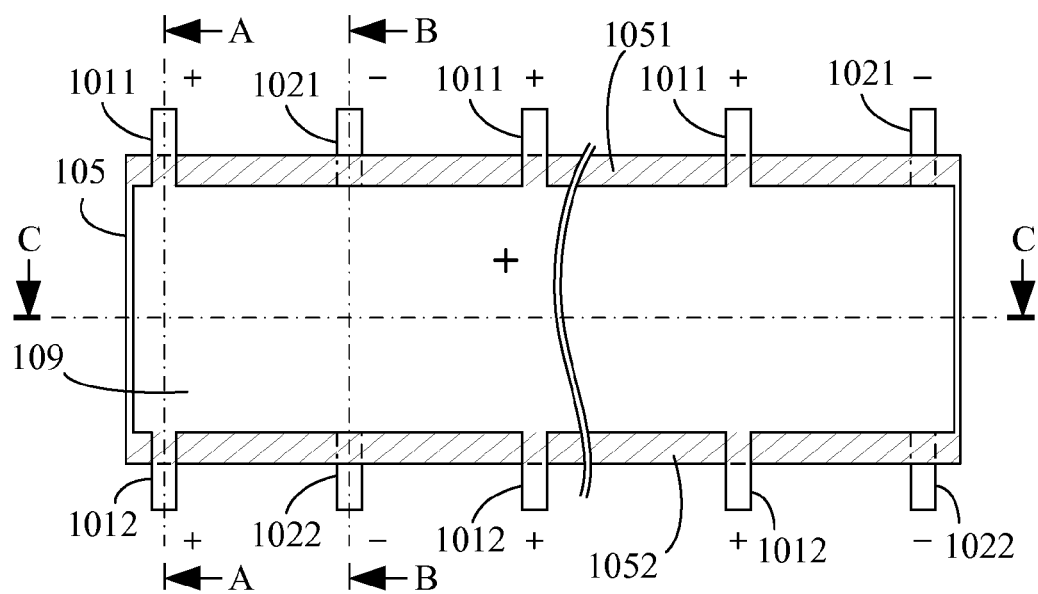
FIG. 56 is a structural develop view showing the multiple input/output electric conductive interface being formed as a rolling structure according to one embodiment of the present invention.

According to the present invention, the electricity storing/discharging device having multiple input/output electric conductive interface covered by electrode plate pair with multiple-sided electric conductive terminals with a single layer means can be further formed as a rolling structure, illustrated as followings:

FIG. 56 is a structural develop view showing the multiple input/output electric conductive interface being formed as a rolling structure according to one embodiment of the present invention.

Figure 57:
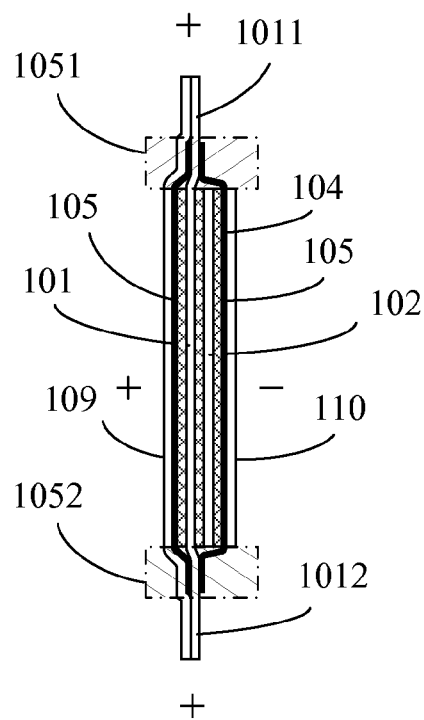
FIG. 57 is a lateral cross sectional view of FIG. 56 taken along A-A.

FIG. 57 is a lateral cross sectional view of FIG. 56 taken along A-A.

Figure 58:
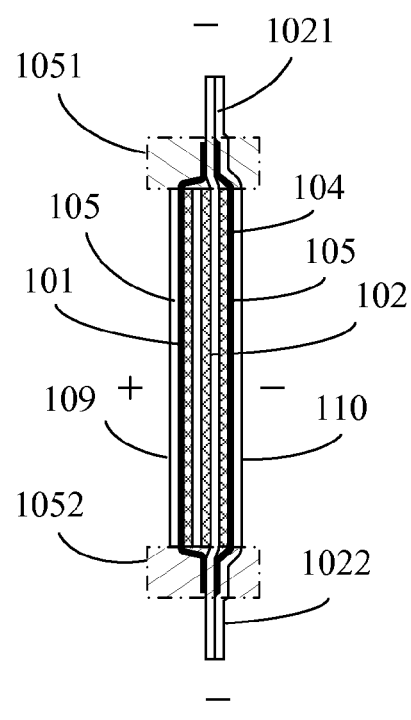
FIG. 58 is a lateral cross sectional view of FIG. 56 taken along B-B.

FIG. 58 is a lateral cross sectional view of FIG. 56 taken along B-B.

As shown in FIG. 56, FIG. 57 and FIG. 58, the positive electrode plate (101) and the negative electrode plate (102) of the input/output electric conductive terminal extended towards two sides and the separator (104) are formed as a rolling structure, and the distal terminals and/or the lateral positive electric conductive member (109) and the lateral negative electric conductive member (110) at two lateral sides being structured as the multiple input/output electric conductive interface.

Figure 59:
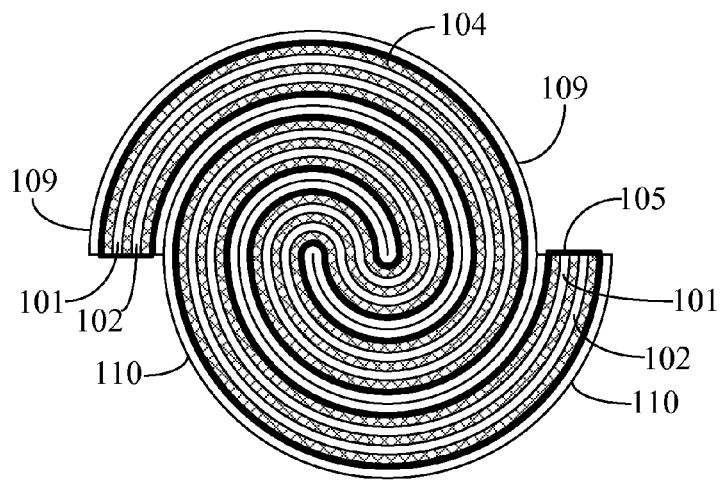
FIG. 59 is the first cross sectional view showing the rolling structure shown in FIG. 56 taken along C-C according to the present invention.

FIG. 59 is the first cross sectional view showing the rolling structure shown in FIG. 56 taken along C-C according to the present invention.

As shown in FIG. 59, at least the lateral positive electric conductive member (109) and the lateral negative electric conductive member (110) at two lateral sides and at least an input/output electric conductive terminal at one distal end defined at one side are individually-arranged for structuring as the multiple input/output electric conductive interface.

Figure 60:
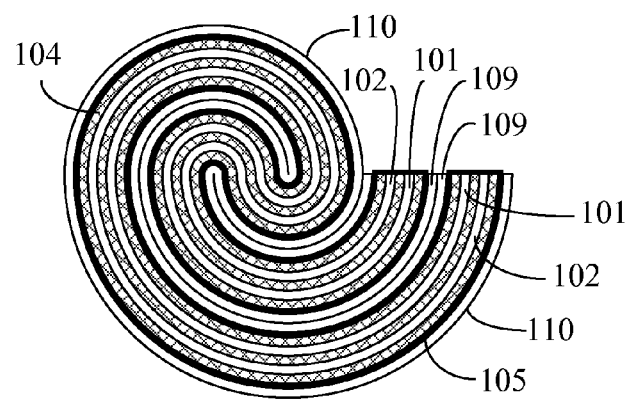
FIG. 60 is the second cross sectional view showing the rolling structure shown in FIG. 56 taken along C-C according to the present invention.

FIG. 60 is the second cross sectional view showing the rolling structure shown in FIG. 56 taken along C-C according to the present invention.

As shown in FIG. 60, the single-layer insulation package enclosed member (105) is served for insulation package at two lateral sides and the input/output electric conductive terminals at two sides are adjacently-arranged for structuring as the multiple input/output electric conductive interface.

Figure 61:
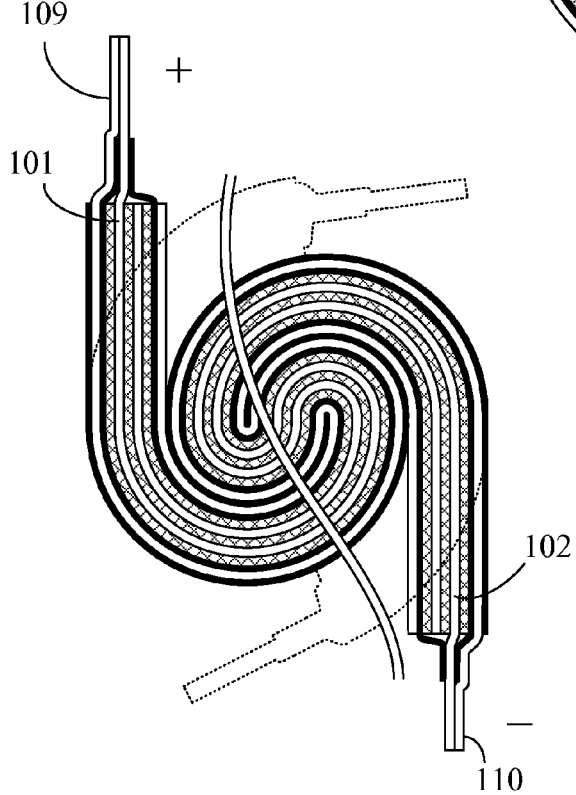
FIG. 61 is the third cross sectional view showing the rolling structure shown in FIG. 56 taken along C-C according to the present invention.

FIG. 61 is the third cross sectional view showing the rolling structure shown in FIG. 56 taken along C-C according to the present invention.

As shown in FIG. 61, the lateral positive electric conductive member (109) and the lateral negative electric conductive member (110) arranged at two lateral sides and the input/output electric conductive terminals at two sides are structures as the multiple input/output electric conductive interface.

The applications of the electricity storing/discharging device having multiple input/output electric conductive interface covered by electrode plate pair with multiple-sided electric conductive terminals with a single layer means are as followings:

individually used; or homo-polarity connected in parallel; or homo-polarity connected in series; or reverse-polarity connected in series; or homo-polarity connected in parallel, then two ends formed through the parallel connection being connected in series by polarity order for boosting voltage; or connected in series by polarity order for boosting voltage, then two ends having the same rated voltage formed through the serial connection being homo-polarity connected in parallel.

According to the electricity storing/discharging device having multiple input/output electric conductive interface covered by electrode plate pair with multiple-sided electric conductive terminals with a single layer means, the geometric shape of the electrode plate can be formed in various geometric shapes such as polygonal, circular or elliptical according to actual needs.

According to the electricity storing/discharging device having multiple input/output electric conductive interface covered by electrode plate pair with multiple-sided electric conductive terminals with a single layer means, two or more sides of each electrode plate are formed with the input/output electric conductive interface, and the two sides can be opposite sides or adjacent sides or three sides or more sides or the periphery thereof can be formed in the circular or elliptical shape.

According to the electricity storing/discharging device having multiple input/output electric conductive interface covered by electrode plate pair with multiple-sided electric conductive terminals with a single layer means, the input/output electric conductive terminal formed on the side of the electrode plate can be one or more than one.

The invention claimed is:

1. An electricity storing/discharging device, comprising: at least one positive electrode plate (101); at least one negative electrode plate (102);

a separator (104) installed between the at least one positive electrode plate (101) and the at least one negative electrode plate (102);

at least one first input/output terminal (1011) extending from a first side of the at least one positive electrode plate (101);

at least one second input/output terminal (1021) extending from a first side of at least one negative electrode plate (102);

at least one third input/output terminal (1012) extending from a second side opposite the first side of the at least one positive electrode plate (101);

at least one fourth input/output terminal (1022) extending from a second side opposite the first side of the at least one negative electrode plate (102);

a sealed packaging member (105) for enclosing the at least one positive electrode plate (101), the at least one negative electrode plate (102), and the separator (104) installed between the electrode plates (101,102), wherein:

the sealed packaging member (105) is filled with an electrolyte, the sealed packaging member (105) includes a first sealing zone (1051) for sealing portions of the at least one first and second input/output terminals (1011,1021) that are adjacent the first side of the at least one positive electrode plate (101) and a second sealing zone (1052) for sealing portions of the at least one third and fourth input/output terminals (1012,1022) that are adjacent the second side of the at least one positive electrode plate (101), and the sealed packaging member (105) further includes respective sealed openings through which the at least one first input/output terminal (1011), the at least one second input/output terminal (1021), the at least one third input/output terminal (1012), and the at least one fourth input/output terminal (1022) respective extend to enable input and/or output of electric energy through at least one of the first and third input/output terminals (1011,1012) and at least one of the second and fourth input/output terminals (1021,1022); a lateral positive electrically conductive member (109) extending along a first exterior side of the sealed packaging member (105) and electrically connecting the first input/output terminal (1011) to the third input/output terminal (1012); and a lateral negative electrically conductive member (110) extending along a second exterior side of the sealed packaging member (105) and electrically connecting the second input/output terminal (1021) to the fourth input/output terminal (1022), wherein distal ends of any two of the first input/output terminal (1011), the second input/output terminal (1021), the third input/output terminal (1012) and the fourth input/output terminal (1022) are inwardly bent along an interior of at least one of the first and second sealing zones (1051,1052) for electrical connection to the respective lateral positive electrically conductive member (109) and lateral negative electrically conductive member (110), and wherein the lateral positive electrically conductive member (109) and lateral negative electrically conductive member (110) form parallel electrical connections between the respective first and third input/output terminals (1011,1012) and second and fourth input/output terminals (1021,1022).

2. An electricity storing/discharging device as claimed in claim 1, wherein the lateral positive electrically conductive member (109) and the lateral negative electrically conductive member (110) each includes a substantially rectangular section.

3. An electricity storing/discharging device as claimed in claim 1, wherein the lateral positive electrically conductive member (109) and the lateral negative electrically conductive member (110) are substantially strip-shaped members.

4. An electricity storing/discharging device as claimed in claim 1, wherein the lateral positive electrically conductive member (109) and the lateral negative electrically conductive member (110) each includes a substantially circular section.

5. An electricity storing/discharging device as claimed in claim 1, wherein the positive electrode plate (101) is integrally formed with the lateral positive electrically conductive member (109), and the negative electrode plate (102) is integrally formed with the lateral negative electrically conductive member (110).

6. An electricity storing/discharging device as claimed in claim 5, wherein the first, second, third, and fourth input/output terminals (1011,1021,1012,1022) are each exposed to provide multiple electrically conductive interfaces on each side of the respective positive and negative electrode plates (101,102) for series, parallel, or series-parallel connection.

7. An electricity storing/discharging device as claimed in claim 5, wherein the first and second input/output terminals (1011,1021) are exposed to provide multiple electrically conductive interfaces on the first sides of the respective positive and negative electrode plates (101,102), and the third and fourth input/output terminals (1012,1022) are sealed within the second sealing zone (1052) on the second sides of the respective positive and negative electrode plates (101,102).

8. An electricity storing/discharging device as claimed in claim 5, wherein one of the first and second input/output terminals (1011,1021) is exposed to provide an electrically conductive interface on the first side of one of the positive and negative electrode plates (101,102), one of the third and fourth input/output terminals (1012,1022) is sealed within the second sealing zone (1052) on the second side of the respective positive and negative electrode plates (101,102), the other of the first and second input/output terminal (1011,1021) is sealed within the first sealing zone (1051) on the first side of the respective positive and negative electrode plates (101,102), and the other of the third and fourth input/output terminals (1012,1022) is exposed to provide an electrically conductive interface on the second side of the other one of the positive and negative electrode plates (101,102).

9. An electricity storing/discharging device as claimed in claim 5, wherein the lateral positive electrically conductive member (109) and the lateral negative electrically conductive member (110) each includes a substantially rectangular section.

10. An electricity storing/discharging device as claimed in claim 5, wherein the lateral positive electrically conductive member (109) and the lateral negative electrically conductive member (110) are substantially strip-shaped members.

11. An electricity storing/discharging device as claimed in claim 5, wherein the lateral positive electrically conductive member (109) and the lateral negative electrically conductive member (110) each includes a substantially circular section.

12. An electricity storing/discharging device as claimed in claim 1, wherein the inwardly-bent distal ends of the third and fourth input/output terminals (1012,1022) are respectively joined to but not integrally formed with the lateral positive and negative electrically conductive members (109, 110).

13. An electricity storing/discharging device as claimed in claim 12, wherein the first, second, third, and fourth input/output terminals (1011,1021,1012,1022) are each exposed to provide multiple electrically conductive interfaces on each side of the respective positive and negative electrode plates (101,102).

14. An electricity storing/discharging device as claimed in claim 12, wherein the first and second input/output terminals (1011,1021) are exposed to provide multiple electrically conductive interfaces on the first sides of the respective positive and negative electrode plates (101,102), and the third and fourth input/output terminals (1012,1022) are sealed within the second sealing zone (1052) on the second sides of the respective positive and negative electrode plates (101,102).

15. An electricity storing/discharging device as claimed in claim 12, wherein one of the first and second input/output terminals (1011,1021) is exposed to provide an electrically conductive interface on the first side of one of the positive and negative electrode plates (101,102), one of the third and fourth input/output terminals (1012,1022) is sealed within the second sealing zone (1052) on the second side of the respective positive and negative electrode plates (101,102), the other of the first and second input/output terminal (1011,1021) is sealed within the first sealing zone (1051) on the first side of the respective positive and negative electrode plates (101,102), and the other of the third and fourth input/output terminals (1012,1022) is exposed to provide an electrically conductive interface on the second side of the other one of the positive and negative electrode plates (101,102).

16. An electricity storing/discharging device as claimed in claim 12, wherein the lateral positive electrically conductive member (109) and the lateral negative electrically conductive member (110) each includes a substantially rectangular section.

17. An electricity storing/discharging device as claimed in claim 12, wherein the lateral positive electrically conductive member (109) and the lateral negative electrically conductive member (110) are substantially strip-shaped members.

18. An electricity storing/discharging device as claimed in claim 12, wherein the lateral positive electrically conductive member (109) and the lateral negative electrically conductive member (110) each includes a substantially circular section.

19. An electricity storing/discharging device as claimed in claim 1, wherein distal ends of each of the first input/output terminal (1011), the second input/output terminal (1021), the third input/output terminal (1012) and the fourth input/output terminal (1022) are inwardly bent along an interior of one of the respective first and second sealing zones (1051, 1052), and exposed to provide multiple electrically conductive interfaces on each of the first and second sides of the respective positive and negative electrode plates (101,102) for series, parallel, or series-parallel connection.

20. An electricity storing/discharging device as claimed in claim 19, wherein the lateral positive electrically conductive member (109) and the lateral negative electrically conductive member (110) are substantially strip-shaped members.

21. An electricity storing/discharging device as claimed in claim 19, wherein the lateral positive electrically conductive member (109) and the lateral negative electrically conductive member (110) each includes a substantially circular section.

22. An electricity storing/discharging device as claimed in claim 1, wherein the sealed packaging member (105) is made of an aluminum laminated film.

23. An electricity storing/discharging device as claimed in claim 1, wherein the separator (104) is made of polyethylene (PE) or polypropylene (PP).

24. An electricity storing/discharging device, comprising:
at least one positive electrode plate (101); at least one negative electrode plate (102);
a separator (104) installed between the at least one positive electrode plate (101) and the at least one negative electrode plate (102);
at least one first input/output terminal (1011) extending from a first side of the at least one positive electrode plate (101);
at least one second input/output terminal (1021) extending from a first side of at least one negative electrode plate (102);
at least one third input/output terminal (1012) extending from a second side opposite the first side of the at least one positive electrode plate (101);
at least one fourth input/output terminal (1022) extending from a second side opposite the first side of the at least one negative electrode plate (102);

a sealed packaging member (105) for enclosing the at least one positive electrode plate (101), the at least one negative electrode plate (102), and the separator (104) installed between the electrode plates (101,102), wherein:

the sealed packaging member (105) is filled with an electrolyte, the sealed packaging member (105) includes a first sealing zone (1051) for sealing portions of the first and second input/output terminals (1011, 1021) that are adjacent first side of the at least one positive electrode plate (101) and a second sealing zone (1052) for sealing portions of the third and fourth input/output terminals (1012,1022) that are adjacent first side of the at least one positive electrode plate (101), and the sealed packaging member (105) further includes respective sealed openings through which the first input/output terminals (1011), the second input/output terminals (1021), the third input/output terminals (1012), and the fourth input/output terminals (1022) respective extend to enable input and/or output of electric energy through the first, second, third, and fourth input/output terminals (1011,1012,1021,1022); a lateral positive electrically conductive member (109) extending along a first exterior side of the sealed packaging member (105) and electrically connecting the at least one first input/output terminal (1011) to the at least one third input/output terminal (1012); and a lateral negative electrically conductive member (110) extending along a second exterior side of the sealed packaging member (105) and electrically connecting the at least one second input/output terminal (1021) to the at least one fourth input/output terminal (1022), wherein the lateral positive electrically conductive member (109) and lateral negative electrically conductive member (110) form parallel electrical connections between the respective first and third input/output terminals (1011,1012) and second and fourth input/output terminals (1021,1022).

25. An electricity storing/discharging device as claimed in claim 24, further comprising at least one additional said first input/output terminal (1011), at least one additional said second input/output terminal (1021), at least one additional said third input/output terminal (1012) electrically connected to the first input/output terminals (1011) by the lateral positive electrically conductive member (109), and at least one additional said fourth input/output terminal (1022) electrically connected to the second input/output terminals (1021) by the lateral negative electrically conductive member (110).

26. An electricity storing/discharging device as claimed in claim 25, wherein the at least one positive electrode plate (101), the at least one negative electrode plate (102), the separator (104), and the sealed packaging member (105) are flexible and formed into a rolled structure.

* * * * *